April 24, 1956

H. HUTCHINGS 2,743,117

DRAFT DEVICE WITH PLURAL CONNECTIONS

Filed Oct. 7, 1953

INVENTOR

HERSCHEL HUTCHINGS

United States Patent Office 2,743,117
Patented Apr. 24, 1956

2,743,117

DRAFT DEVICE WITH PLURAL CONNECTIONS

Herschel Hutchings, Lubbock, Tex.

Application October 7, 1953, Serial No. 384,653

2 Claims. (Cl. 280—456)

This invention relates to tractor hitches and more particularly to a three-point type of tractor hitch.

It is an object of the present invention to provide a three-point tractor hitch for the connecting of three point hitch implements to the tractor with a minimum of effort and without the handling of the implement by the operator.

It is another object of the invention to provide a three-point hitch which will permit the implement to be picked up and moved about without carrying on the full hitching procedure of connecting the implement to the tractor merely for the purpose of transporting the same and when work is not needed to be performed with the implement.

Other objects of the invention are to provide a three-point tractor hitch arrangement for implements, having the above objects in mind which is of simple construction, inexpensive to manufacture, has a minimum number of parts, compact, convenient to use, and efficient in operation.

For a better understanding of the invention, reference may be had to the following detailed description taken in connection with the accompanying drawing, in which.

Figure 1:
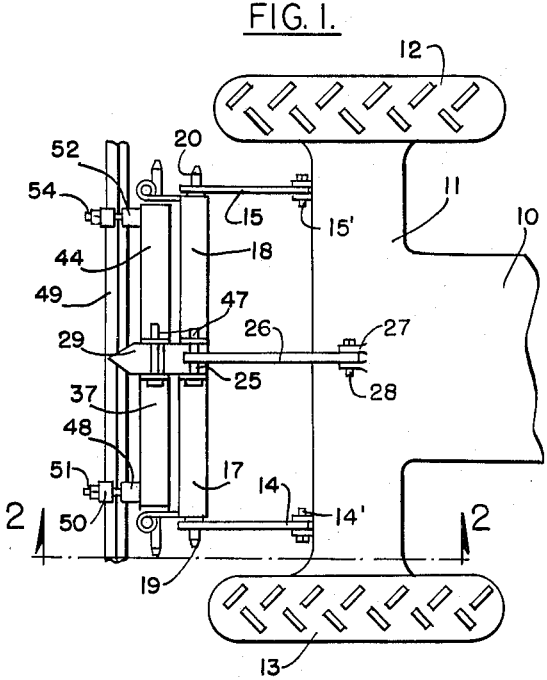
Figure 1 is a top plan view of the tractor hitch arrangement and of a fragment of a tractor.
Figure 2:
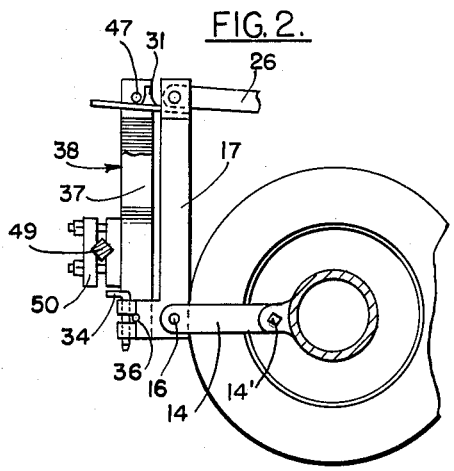
Fig. 2 is a side elevational view of the tractor hitch arrangement as viewed generally on line 2—2 of Fig. 1.
Figure 3:
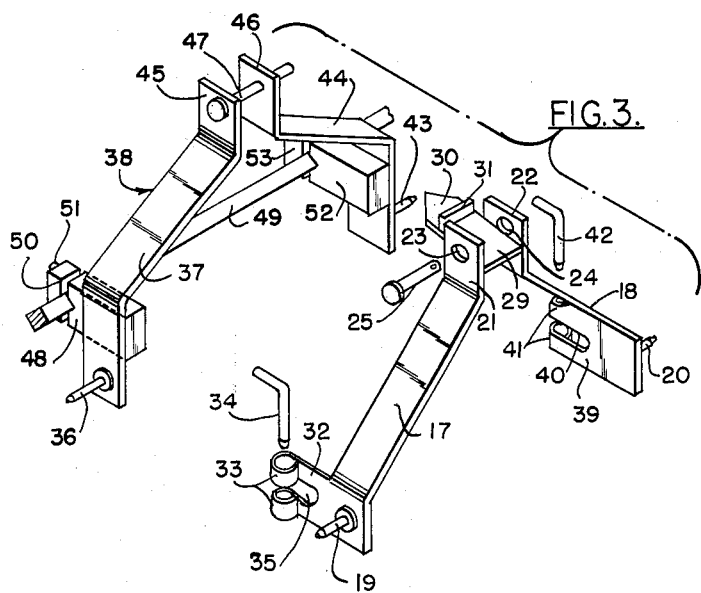
Fig. 3 is a collective and perspective view of the several tractor hitch parts with the implement parts separated from the tractor part.

Referring now to the figures, 10 represents a tractor having a rear axle structure 11 with tractor wheels 12 and 13 thereon. Extending rearwardly from the tractor axle are laterally-spaced vertically-swingable hitch links 14 and 15 pivotally connected respectively by pins 14′ and 15′ to lugs on the rear axle structure 11. The power lift is connected to the lower link to effect the lifting of the implement. Each of these hitch links has a hole 16 in the outer end thereof. Side members 17 and 18 respectively have outwardly extending pivot pins 19 and 20 adapted to extend respectively through the respective holes 16 in the links 14 and 15 in order to mount the side members on the tractor. The side members 17 and 18 have turned up ends 21 and 22 respectively which oppose each other and which respectively have holes 23 and 24 through which a pivot connecting pin 25 can be extended to connect the side members with a single upper links 26 which is pivotally connected to lugs 27 on the tractor by a pin 28.

The upturned ends 21 and 22 are spaced by an upwardly and rearwardly inclined hitch connecting plate 29 having a pointed rear end 30 and an upwardly extending stop projection 31.

On the lower end of the side member 17 is a bifurcated portion 32 having vertically-spaced pin receiving portions 33 for receiving a connecting pin 34. These pin receiving portions 33 are spaced by a rearwardly extending slot 35 for receiving a laterally-extending pin 36 of a side frame member 37 of a tractor implement 38.

The side frame member 18 has a bifurcated portion 39 providing a slot 40 and vertically spaced pin receiving portions 41 adapted to receive a pin 42 for retaining within the slot 40 a laterally extending pin projection 43 of a side member 44 of the implement hitch frame 38. The side members 37 and 44 of the hitch 38 have respectively turned up ends 45 and 46 for receiving a hitch pin 47.

On the side member 37 is a rearwardly-extending clamp block 48 which is notched on its rearward end to receive a square tool bar 49. This tool bar is fixed to the clamp block 48 by a rear clamp plate 50 and bolts 51.

The side member 44 has a rearwardly-extending clamp block 52 which is also notched to receive tool bar 49 and to which there is attached a clamping plate 53 and clamping bolts 54. Any type of tool elements can be fixed to the tool bar 49 depending upon the nature of the work to be done with the tractor.

With the hitch connected to the tractor in the manner above described, the tractor can be backed into an implement and the plate 29 extended under the transverse bolt 47 of the implement hitch until the bolt abuts the stop 31.

The hitch on the tractor is then lifted by the power lift of the tractor acting on the lower links in the usual manner, not shown, and as the implement is lifted, the projections 36 and 43 will respectively slide into slots 35 and 40 of the hitch part side members 17 and 18. The slight slope of the connecting plate 29 is to permit the implement to be lifted somewhat and to properly align itself so that the pins 36 and 43 will enter the slots 35 and 40 without the operator having to handle the implement. The hitch pins 34 and 42 will then be inserted in the pin receiving portions so as to fix the implement hitch frame to the side members 17 and 18 of the hitch part on the tractor. It will now be seen that the implement has been attached to the hitch part of the tractor and that it may now be transported on the tractor or put into use.

To unhitch the implement the pins 34 and 42 are removed, and the implement is lowered so that its weight is not on the hitch and upon driving the tractor forwardly and lowering the hitch part, the transverse bolt 47 will ride off the hitch plate 29 and the tractor will be moved off from the implement.

After the implement has been picked up and before the pins 34 and 42 are inserted in the holes provided for them, the implement may be carried about and set down as desired without the pins 34 and 42 being inserted.

It should now be apparent that there has been provided a simple three-point tractor hitch arrangement for direct connecting implements whereby the connecting of the implement to the hitch on the tractor can be effected with minimum effort and without the handling of the implement by the operator.

While various changes may be made in the detail construction, it shall be understood that such changes shall be within the spirit and scope of the present invention as defined by the appended claims.

What is claimed is:

1. A tractor hitch assembly comprising vertically-swingable links, side members having projections respectively extending through the free ends of said links, said side members having upturned ends, a hitch plate connected between the upturned ends and extending rearwardly therefrom and upwardly inclined, said side members respectively having slots, an implement hitch part having side members with laterally extending projections adapted to respectively enter said slots on the respective first named side members, said side members of the implement hitch part having respectively turned up ends spaced from one another, a hitch pin extending between the turned up ends, and said inclined hitch plate being engageable with said hitch pin on the implement hitch part to join the tractor and implement hitch parts together, and tool supporting means on the implement hitch part.

2. In combination, a tractor having rearwardly-extending vertically-swingable links with end openings disposed respectively therein, a tractor hitch part comprising first side members having respectively laterally-extending projections extending respectively through the openings of the rearwardly extending links on the tractor, said first side members respectively having first upturned ends, an upper tractor link extending between the first upturned ends, a pin connecting said link to said first upturned ends, a hitch plate extending rearwardly from said first upturned ends and inclined upwardly, each of the first side members of the hitch part respectively having a bifurcated portion providing an open slot, pin opening portions vertically spaced from one another and lying respectively on the upper and lower sides of said slot, an implement hitch part comprising second side members, said second side members respectively having laterally extending projections adapted to engage respectively with the slots of the first side members of the tractor hitch part, pins extending through the pin opening portions to retain the laterally extending projections in place within the slots, said second side members of the implement hitch part having second upturned ends, the said second upturned ends being spaced from one another and a hitch pin extending laterally therebetween, said pin being engageable with the rearwardly extending hitch plate, a vertical extending stop projection on the rearward extending plate to limit the forward movement of the hitch pin on the implement hitch part, and tool supporting means connected to the side members of the implement hitch part.

References Cited in the file of this patent
UNITED STATES PATENTS

| 2,413,807 | Warne | Jan. 7, 1947 |
| 2,527,613 | Zagurski | Oct. 31, 1950 |
| 2,531,768 | Cline et al. | Nov. 28, 1950 |
| 2,618,211 | Fraga | Nov. 18, 1952 |
| 2,662,783 | Sawyer | Dec. 15, 1953 |